(12) United States Patent
Lee et al.

(10) Patent No.: US 11,425,568 B2
(45) Date of Patent: Aug. 23, 2022

(54) ELECTRONIC DEVICE AND CONTROLLING METHOD OF ELECTRONIC DEVICE

(71) Applicant: SAMSUNG ELECTRONICS CO., LTD., Suwon-si (KR)

(72) Inventors: Hosun Lee, Suwon-si (KR); Junbum Shin, Suwon-si (KR); Jungil Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 305 days.

(21) Appl. No.: 16/712,502

(22) Filed: Dec. 12, 2019

(65) Prior Publication Data
US 2020/0213859 A1   Jul. 2, 2020

(30) Foreign Application Priority Data
Dec. 28, 2018  (KR) ........................ 10-2018-0172811

(51) Int. Cl.
*G06F 21/00* (2013.01)
*H04W 12/122* (2021.01)
(Continued)

(52) U.S. Cl.
CPC ....... *H04W 12/122* (2021.01); *H04L 63/1416* (2013.01); *H04L 63/1425* (2013.01);
(Continued)

(58) Field of Classification Search
CPC ............ H04W 12/122; H04W 12/082; H04W 12/108; H04W 88/08; H04W 12/79;
(Continued)

(56) References Cited

U.S. PATENT DOCUMENTS

| 7,958,555 B1 | 6/2011 | Chen et al. |
| 8,151,336 B2 | 4/2012 | Savoor |

(Continued)

FOREIGN PATENT DOCUMENTS

| EP | 2372971 A1 | 10/2011 |
| EP | 3488577 B1 * | 1/2021 |

(Continued)

OTHER PUBLICATIONS

International Search Report and Written Opinion dated Mar. 26, 2020 issued by the International Searching Authority in International Application No. PCT/KR2019/017623.
Communication dated Apr. 17, 2020 issued by the European Patent Office in European Application No. 19215448.2.

*Primary Examiner* — Kendall Dolly
(74) *Attorney, Agent, or Firm* — Sughrue Mion, PLLC

(57) ABSTRACT

Disclosed are an electronic device capable of verifying security of a Wi-Fi network and a controlling method thereof. To be specific, the electronic device, in response to the received user command, obtains, through a first channel, first information related to an address of the website, and obtains, from a server providing the website through a second channel, second information related to the address of the website, based on the first information and the second information being identical, maintains communication with the server through the first channel, and based on the first information and the second information being different, terminates the communication with the server through the first channel or communicate with the server through the first channel according to the second information.

15 Claims, 10 Drawing Sheets

(51) Int. Cl.
*H04L 9/40* (2022.01)
*H04L 67/02* (2022.01)
*H04W 88/08* (2009.01)
*H04W 12/082* (2021.01)
*H04W 12/108* (2021.01)

(52) U.S. Cl.
CPC ...... *H04L 63/1466* (2013.01); *H04L 63/1483* (2013.01); *H04L 67/02* (2013.01); *H04W 12/082* (2021.01); *H04W 12/108* (2021.01); *H04W 88/08* (2013.01)

(58) Field of Classification Search
CPC .. H04W 80/12; H04W 88/06; H04L 63/1416; H04L 63/1425; H04L 63/1466; H04L 63/1483; H04L 67/02; H04L 63/18
See application file for complete search history.

(56) References Cited

U.S. PATENT DOCUMENTS

| 9,100,434 B2 | 8/2015 | Nakamizo et al. | |
|---|---|---|---|
| 2015/0163734 A1* | 6/2015 | Park | H04W 12/122 370/338 |
| 2016/0277427 A1* | 9/2016 | Deshpande | H04L 63/1416 |
| 2017/0126705 A1* | 5/2017 | Mirashrafi | H04L 63/145 |

FOREIGN PATENT DOCUMENTS

| EP | 3488577 B1 * | 9/2021 | H04L 63/14 |
|---|---|---|---|
| KR | 10-1099537 B1 | 12/2011 | |
| KR | 1020120121817 A | 11/2012 | |
| KR | 1020130057678 A | 6/2013 | |
| KR | 10-1316059 B1 | 10/2013 | |
| KR | 1020150041407 A | 4/2015 | |

* cited by examiner

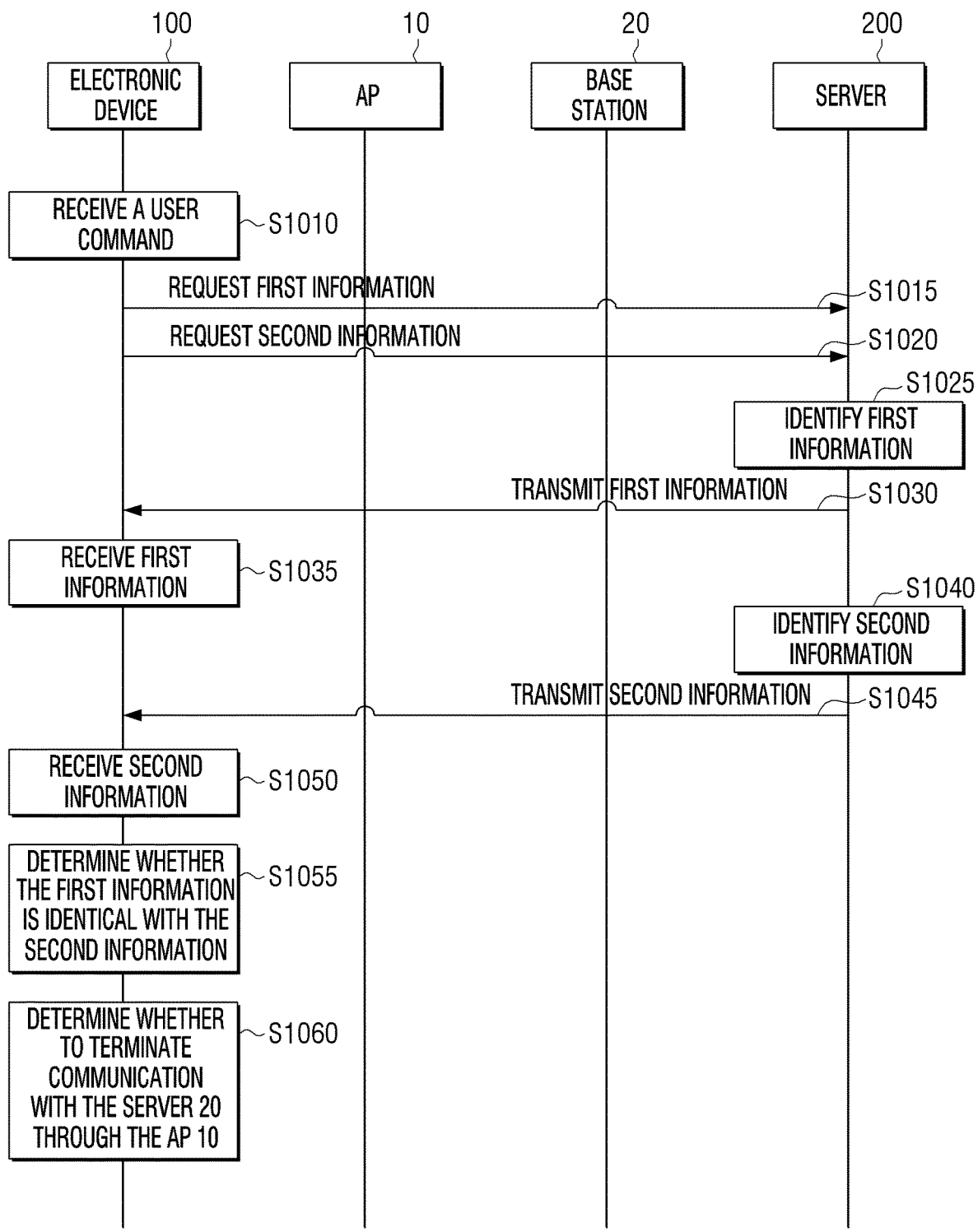

ELECTRONIC DEVICE AND CONTROLLING METHOD OF ELECTRONIC DEVICE

CROSS-REFERENCE TO RELATED APPLICATION(S)

This application is based on and claims priority under 35 U.S.C. § 119 to Korean Patent Application No. 10-2018-0172811, filed on Dec. 28, 2018, in the Korean Intellectual Property Office, the disclosure of which is incorporated by reference herein in its entirety.

BACKGROUND

1. Field

The disclosure relates to an electronic device and a controlling method thereof. More particularly, the disclosure relates to an electronic device capable of verifying security of a Wi-Fi network, and a controlling method thereof.

2. Description of Related Art

Attacks on a wireless fidelity (Wi-Fi) network using a malicious access point (AP) are of increasing concern. In particular, an instance of generating a malicious AP in a manner such as modulating AP firmware, camouflaging the malicious AP as if a normal AP using a popular service set identifier (SSID), and seizing a user's information has been drastically increasing.

Technologies have been developed to verify the security of the AP in response to attacks on the Wi-Fi network, but related art security verification techniques that verify certificates received from the AP via a mobile network are only available for the APs that support that function. In particular, there is a limitation in securing the use of a Wi-Fi network in various environments through a mobile device.

In addition, a black list-based phishing site detection technique provided through a web browser via a safe browsing function is limited in that a fake website operating in an internal network via an AP attack is not registered in a blacklist database and therefore undetectable.

A mobile network has a relatively high security compared to a Wi-Fi network, but has a disadvantage in that the data transmission speed is relatively slow and the mobile communication charges increase in accordance with the amount of data transmission. Therefore, it is common for a user to prefer a Wi-Fi network, unless a connectable AP is not within range.

Accordingly, there is a need for techniques capable of verifying security for a Wi-Fi network by effectively detecting man-in-the-middle (MITM) attacks using a malicious AP.

SUMMARY

Provided are an electronic device capable of verifying security of a Wi-Fi network and a controlling method thereof.

Additional aspects will be set forth in part in the description which follows and, in part, will be apparent from the description, or may be learned by practice of the presented embodiments.

In accordance with an aspect of the disclosure, an electronic device includes: a first communication interface; a second communication interface; a memory storing at least one instruction; and a processor configured to execute the at least one instruction to: receive a user command to access a website, in response to the received user command, obtain, through a first channel that is established through the first communication interface, first information related to an address of the website, and obtain, from a server providing the website through a second channel that is established through the second communication interface, second information related to the address of the website, based on the first information and the second information being identical, maintain communication with the server through the first channel, and based on the first information and the second information being different, terminate the communication with the server through the first channel or communicate with the server through the first channel according to the second information.

The first information and the second information may each include information on a protocol that is used for communication with the server.

The processor may be further configured to execute the at least one instruction to, based on HyperText Transfer Protocol (HTTP) being included in the first information and HyperText Transfer Protocol Secure (HTTPS) being included in the second information, communicate with the server through the first channel according to the second information.

The first communication interface may be a communication interface to access an access point for a Wi-Fi network; and the second communication interface may be a communication interface to access a base station for a mobile network.

The processor may be further configured to execute the at least one instruction to: in response to the received user command, further obtain, through the first channel, third information including fingerprint information on a feature point of a content that is included in the website, and further obtain, from the server through the second channel, fourth information including the fingerprint information, based on the third information and the fourth information being identical, maintain the communication with the server through the first channel, and based on the third information and the fourth information being different, terminate the communication with the server through the first channel.

The first information and the second information may each include information on a domain name of the website.

The electronic device may further include: an output interface, wherein the processor may be further configured to execute the at least one instruction to, based on the first information and the second information being different, provide, via the output interface, a notification asking whether to terminate the communication with the server through the first channel.

In accordance with another aspect of the disclosure a controlling method of an electronic device includes: receiving a user command to access a website; in response to the received user command, obtaining, through a first channel that is established through a first communication interface of the electronic device, first information related to an address of the website, and obtaining, from a server through a second channel that is established through a second communication interface of the electronic device, second information related to the address of the website; based on the first information and the second information being identical, maintaining communication with the server through the first channel; and based on the first information and the second information being different, terminating the communication with the server through the first channel or communicating with the server through the first channel according to the second information.

The first information and the second information may each include information on a protocol that is used for communication with the server.

The terminating the communication with the server through the first channel or the communicating with the server through the first channel according to the second information may include: based on HyperText Transfer Protocol (HTTP) being included in the first information and HyperText Transfer Protocol Secure (HTTPS) being included in the second information, communicating with the server through the first channel according to the second information.

The first channel may be a channel that is established through an access point for a Wi-Fi network; and the second channel may be a channel that is established through a base station for a mobile network.

The obtaining may include, in response to the received user command, further obtaining, through the first channel, third information including fingerprint information on a feature point of a content that is included in the website, and further obtaining, from the server through the second channel, fourth information including the fingerprint information; the maintaining the communication may include, based on the third information and the fourth information being identical, maintaining the communication with the server through the first channel; and the terminating the communication may include, based on the third information and the fourth information being different, terminating the communication with the server through the first channel.

The first information and the second information may each include information on a domain name of the website.

The method may further include: based on the first information and the second information being different, providing a notification asking whether to terminate the communication with the server through the first channel.

In accordance with another aspect of the disclosure, a non-transitory computer readable recording medium includes a program for executing a controlling method of an electronic device, the controlling method of the electronic device including: receiving a user command to access a website; in response to the received user command, obtaining, through a first channel that is established through a first communication interface of the electronic device, first information related to an address of the website, and obtaining, from a server through a second channel that is established through a second communication interface of the electronic device, second information related to the address of the website; based on the first information and the second information being identical, maintaining communication with the server through the first channel; and based on the first information and the second information being different, terminating the communication with the server through the first channel or communicating with the server through the first channel according to the second information.

The first information and the second information may each include information on a protocol that is used for communication with the server.

The terminating the communication with the server through the first channel or the communicating with the server through the first channel according to the second information may include: based on HyperText Transfer Protocol (HTTP) being included in the first information and HyperText Transfer Protocol Secure (HTTPS) being included in the second information, communicating with the server through the first channel according to the second information.

The first channel may be a channel that is established through an access point for a Wi-Fi network; and the second channel may be a channel that is established through a base station for a mobile network.

The obtaining may include, in response to the received user command, further obtaining, through the first channel, third information including fingerprint information on a feature point of a content that is included in the website, and further obtaining, from the server through the second channel, fourth information including the fingerprint information; the maintaining the communication may include, based on the third information and the fourth information being identical, maintaining the communication with the server through the first channel; and the terminating the communication may include, based on the third information and the fourth information being different, terminating the communication with the server through the first channel.

The first information and the second information may each include information on a domain name of the website.

In accordance with another aspect of the disclosure, a controlling method of an electronic device includes: in response to a command to access a website provided by a server, obtaining, through a first channel, first information related to an address of the website and/or including fingerprint information on a feature point of a content that is included in the website, and obtaining, from the server through a second channel, second information related to the address of the website and/or including the fingerprint information; based on the first information and the second information being identical, maintaining communication with the server through the first channel; and based on the first information and the second information being different, terminating the communication with the server through the first channel or communicating with the server through the first channel according to the second information.

The first information and the second information may each include information on a protocol that is used for communication with the server.

The terminating the communication with the server through the first channel or the communicating with the server through the first channel according to the second information may include: based on HyperText Transfer Protocol (HTTP) being included in the first information and HyperText Transfer Protocol Secure (HTTPS) being included in the second information, communicating with the server through the first channel according to the second information.

The first channel may be a channel that is established through an access point for a Wi-Fi network; and the second channel may be a channel that is established through a base station for a mobile network.

The first information and the second information may each include information on a domain name of the website.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 10 is a sequence view illustrating a security confirmation process of Wi-Fi network in a time-series manner according to an embodiment.

DETAILED DESCRIPTION

Figure 1:
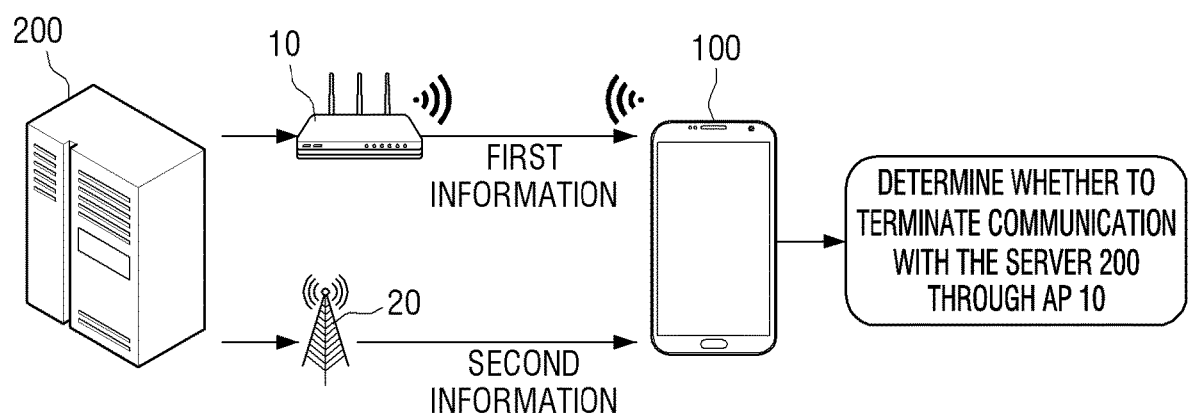
FIG. 1 is a view provided to describe a security confirmation process of a Wi-Fi network according to an embodiment.

Hereinafter, embodiments of the disclosure will be described with reference to the accompanying drawings. However, it may be understood that the disclosure is not limited to the embodiments described hereinafter, but also includes various modifications, equivalents, and/or alternatives of the embodiments of the disclosure. In relation to explanation of the drawings, similar drawing reference numerals may be used for similar constituent elements.

In addition, the following embodiments may be modified in many different forms, and the scope of the technical spirit of the disclosure is not limited to the following examples. Rather, these embodiments are provided so that this disclosure will be thorough and complete, and will fully convey the technical spirit to those skilled in the art.

The terms used herein are to describe certain embodiments and are not intended to limit the scope of claims. A singular expression includes a plural expression unless otherwise specified.

In this specification, the expressions "have," "may have," "include," or "may include" or the like represent presence of a corresponding feature (for example: components such as numbers, functions, operations, or parts) and does not exclude the presence of additional feature.

In this document, expressions such as "at least one of A [and/or] B," or "one or more of A [and/or] B," include all possible combinations of the listed items. For example, "at least one of A and B," or "at least one of A or B" includes any of (1) at least one A, (2) at least one B, or (3) at least one A and at least one B.

As used herein, the terms "first," "second," or the like may denote various components, regardless of order and/or importance, and may be used to distinguish one component from another, and does not limit the components.

If it is described that a certain element (e.g., first element) is "operatively or communicatively coupled with/to" or is "connected to" another element (e.g., second element), it should be understood that the certain element may be connected to the other element directly or through still another element (e.g., third element).

On the other hand, if it is described that a certain element (e.g., first element) is "directly coupled to" or "directly connected to" another element (e.g., second element), it may be understood that there is no element (e.g., third element) between the certain element and the another element.

Also, the expression "configured to" used in the disclosure may be interchangeably used with other expressions such as "suitable for," "having the capacity to," "designed to," "adapted to," "made to," and "capable of," depending on cases. Meanwhile, the term "configured to" does not necessarily mean that a device is "specifically designed to" in terms of hardware.

Instead, under some circumstances, the expression "a device configured to" may mean that the device "is capable of" performing an operation together with another device or component. For example, the phrase "a processor configured to perform A, B, and C" may mean a dedicated processor (e.g., an embedded processor) for performing the corresponding operations, or a generic-purpose processor (e.g., a central processing unit (CPU) or an application processor) that can perform the corresponding operations by executing one or more software programs stored in a memory device.

Terms such as "module," "unit," "part," and so on are used to refer to an element that performs at least one function or operation, and such element may be implemented as hardware or software, or a combination of hardware and software. Further, except for when each of a plurality of "modules," "units," "parts," and the like needs to be realized in an individual hardware, the components may be integrated in at least one module or chip and be realized in at least one processor.

It is understood that various elements and regions in the figures are shown out of scale. Accordingly, the scope of the disclosure is not limited by the relative sizes or spacing drawn from the accompanying drawings.

An electronic device according to various embodiments may include at least one of, for example, a smartphone, a tablet personal computer (PC), a desktop PC, a laptop PC, or a wearable device. A wearable device may include at least one of an accessory type (e.g., a watch, a ring, a bracelet, an ankle bracelet, a necklace, a pair of glasses, a contact lens or a head-mounted-device (HMD)); a fabric or a garment-embedded type (e.g.: electronic cloth); skin-attached type (e.g., a skin pad or a tattoo); or a bio-implantable circuit.

In some embodiments, the electronic device may include at least one of, for example, a television, a digital video disk (DVD) player, an audio system, a refrigerator, air-conditioner, a cleaner, an oven, a microwave, a washing machine, an air purifier, a set top box, a home automation control panel, a security control panel, a media box (e.g., SAMSUNG HOMESYNC™, APPLE TV™, or GOOGLE TV™), a game console (e.g., XBOX™, PLAYSTATION™), an electronic dictionary, an electronic key, a camcorder, or an electronic frame.

In other embodiments, the electronic device may include at least one of a variety of medical devices (e.g., various portable medical measurement devices such as a blood glucose meter, a heart rate meter, a blood pressure meter, or a temperature measuring device), magnetic resonance angiography (MRA), magnetic resonance imaging (MRI), computed tomography (CT), or ultrasonic wave device, etc.), a navigation system, a global navigation satellite system (GNSS), an event data recorder (EDR), a flight data recorder (FDR), an automotive infotainment devices, a marine electronic equipment (e.g., marine navigation devices, gyro compasses, etc.), avionics, a security device, a car head unit, industrial or domestic robots, a drone, an automated teller machine (ATM), a point of sale of a store, or an Internet of Things (IoT) device (e.g., light bulbs, sensors, sprinkler devices, fire alarms, thermostats, street lights, toasters, exercise equipment, hot water tanks, heater, boiler, etc.).

Hereinafter, with reference to the attached drawings, embodiments will be described in detail so that those skilled in the art to which the disclosure belongs to can easily make and use the embodiments.

FIG. 1 is a view provided to describe a security confirmation process of a Wi-Fi network according to an embodiment.

As illustrated in FIG. 1, an electronic device 100 according to an embodiment may communicate with a server 200 that provides a website. To be specific, the electronic device 100 may communicate with the server 200 that provides a website through either a Wi-Fi network or the mobile network.

The electronic device 100 may access an access point (AP) 100 for the Wi-Fi network and establish a first channel for communicating with the server 200. The electronic device 100 may communicate with the server 200 through the established first channel.

Furthermore, the electronic device 100 may access a base station 20 for the mobile network and establish a second channel to communicate with the server 200. The electronic device 100 may communicate with the server 200 through the established second channel.

Embodiments described hereinbelow confirm the security of the first channel based on information obtained through the second channel, the second channel having a relatively high security as compared to the first channel. It is understood, however, that one or more other embodiments are not limited to the case where the first channel is a channel for a Wi-Fi network and the second channel is a channel for a mobile network. That is, as long as the security of the first channel may be confirmed based on the information obtained through the second channel, the first channel and the second channel according to various embodiments may be channels for various types of networks.

Hereinafter, for convenience of description, it is assumed that the electronic device 100 communicates with the server 200 through the first channel via the Wi-Fi network and the second channel via the mobile network.

Meanwhile, the electronic device 100 may receive a user command for accessing a website. In response to the received user command, the electronic device 100 may obtain first information related to the address of the website from the server 200 providing the website through the first channel, and obtain the second information related to the address of the website from the server 200 through the second channel.

Here, the first information and the second information are information capable of identifying a website. The information refers to information capable of confirming security of a communication channel for communicating with a server providing the corresponding website by comparing both information.

Specifically, the first information and the second information may be information related to the address of the website. The information related to the address of the website may include at least one of information related to a protocol that is used for communication with the server 200 providing the website and information on a domain name of a website.

According to an embodiment, the information on the protocol that is used for communicating with the server 200 providing a website may include information on a response of the server 200 for a hypertext transfer protocol (HTTP) request of the electronic device 100. For example, when accessing a website of which domain name is www.ABC-.com via the first channel, and accessing a website of which domain name is www.ABC.com via the second channel, the server 200 providing the website may transmit an HTTP (e.g., http://www.ABC.com) response or HTTP Secure (HTTPS) (e.g., https://www.ABC.com) response through the first channel and the second channel, respectively.

According to an embodiment, the electronic device 100 may further obtain, from the server 200, fingerprint information for a feature point of a content included in a website as well as information related to the website address.

The information obtained through the first channel and the second channel is not limited to the above examples, and various embodiments may be applied to any information that can confirm security of the first channel, by comparing the information obtained through the first channel and the information obtained through the second channel.

Meanwhile, when the first information is obtained through the first channel and the second information is obtained through the second channel, the electronic device 100 may determine whether to terminate communication with the server 200 through the first channel by confirming whether a man-in-the-middle (MITM) attack for the first channel has occurred based on the obtained first information and the obtained second information.

Specifically, when the obtained first information and the obtained second information are the same, the electronic device 100 may maintain communication with the server 200 through the first channel. When the obtained first information and the obtained second information are different, the electronic device 100 may terminate communication with the server 200 through the first channel.

In other words, if the information obtained through the first channel and the information obtained through the second channel having relatively higher security than the first channel are the same, the electronic device 100 may determine that the security of the first channel is verified and may maintain communication with the server 200 through the first channel. In contrast, if the information obtained through the first channel and the information obtained through the second channel are different, the electronic device 100 may determine that the MITM attack for the first channel has occurred and may terminate communication with the server 200 through the first channel.

In the aforementioned example, when the server 200 providing the website transmits the HTTPS (e.g., https://www.ABC.com) response through the first channel, and transmits the HTTPS (e.g., https://www.ABC.com) response through the second channel as well, the electronic device 100 may determine that the security of the first channel is confirmed and maintain communication with the server 200 through the first channel.

When the server 200 providing a website transmits the HTTP (e.g., http://www.ABC.com) response through the first channel and transmits the HTTPS (e.g., https://www.ABC.com) response through the second channel, the electronic device 100 may determine that the MITM attack on the first channel has occurred, and terminate the communication with the server 200 through the first channel.

According to an embodiment, the electronic device 100 may verify security of the Wi-Fi network by confirming occurrence of the MITM attack for a specific access point 100 based on the information obtained through the mobile network, and then communicate with the server 200 providing a website through the Wi-Fi network.

Accordingly, a user of the electronic device 100 may use the mobile network within a limit for security confirmation of the Wi-Fi network, and then may use a Wi-Fi network that has relatively fast data transmission speed and may not incur a mobile communication fee according to data transmission amount.

Figure 2:
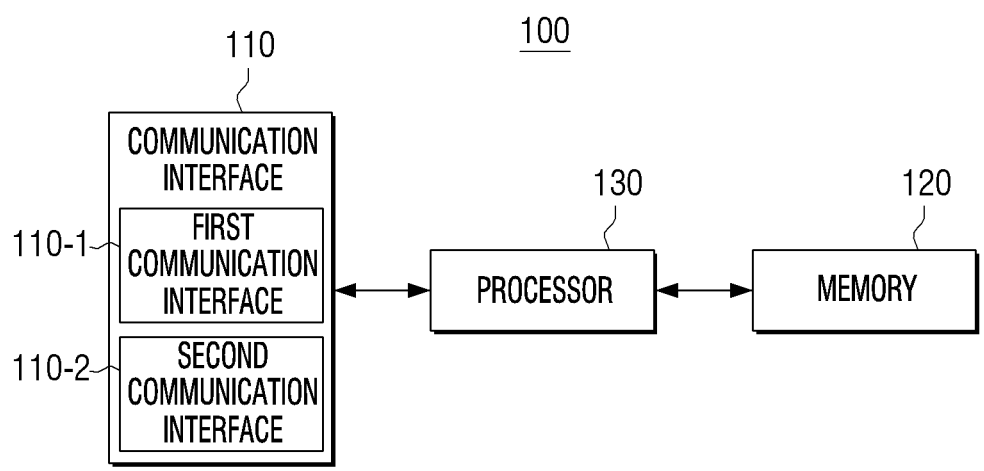
FIG. 2 is a block diagram illustrating a configuration of an electronic device according to an embodiment.

FIG. 2 is a block diagram illustrating a configuration of an electronic device 100 according to an embodiment.

As illustrated in FIG. 2, the electronic device 100 according to an embodiment includes a first communication interface 110-1, a second communication interface 110-2, a memory 120, and a processor 130.

The first communication interface 110-1 and the second communication interface 110-2 may both communicate with the server 200. In particular, the first communication interface 110-1 and the second communication interface 110-2 may both communicate with the server 200 providing the website, transmit user information to the server 200, and receive information included in the website from the server 200.

In various embodiments, the first communication interface 110-1 may be a communication interface 110 for accessing an access point for a Wi-Fi network, and the second communication interface 110-2 may be the communication interface 110 for accessing a base station for a mobile network. Meanwhile, the term communication interface 110 hereinafter will be collectively referred to as the first communication interface 110-1 and the second communication interface 110-2.

At least one instruction regarding the electronic device 100 may be stored in the memory 120. In addition, an operating system (O/S) for driving the electronic device 100 may be stored in the memory 120. The memory 120 may store various software programs or applications for operating the electronic device 100 according to various embodiments. The memory 120 may include a semiconductor memory such as a flash memory, a magnetic storage medium such as a hard disk, or the like.

Specifically, the memory 120 may store various software modules for operating the electronic device 100, and the processor 130 (e.g., at least one processor) may control the operation of the electronic device 100 by executing various software modules that are stored in the memory 120. That is, the memory 120 may be accessed by the processor 130, and may perform reading, recording, modifying, deleting, updating, or the like, of data by the processor 130.

It is understood that the term memory 120 may be used to refer to any volatile or non-volatile memory, a ROM, RAM proximate to or in the processor 130 or a memory card (for example, a micro SD card, a memory stick) mounted to the electronic device 100.

According to various embodiments, the memory 120 may store first information and second information related to an address of a website, and third information and fourth information including fingerprint information about a feature point of content, or the like. Specifically, when the processor 130 obtains the first information and the second information related to the address of the website and the third information and the fourth information including the fingerprint information about the feature point of the content through the communication interface 110, the obtained first information, second information, third information, and fourth information may be stored in the memory 120.

The processor 130 controls overall operations of the electronic device 100. Specifically, the processor 130 is connected to a configuration of the electronic device 100 including the first communication interface 110-1, the second communication interface 110-2 and the memory 120 as described above, and controls overall operations of the electronic device 100 by executing at least one instruction stored in the memory 120 as described above.

The processor 130 may be implemented in various ways. For example, the processor 130 may be implemented as at least one of an application specific integrated circuit (ASIC), an embedded processor, a microprocessor, a hardware control logic, a hardware finite state machine (FSM), a digital signal processor (DSP), or the like. Further, processor 130 may include at least one of a central processing unit (CPU), a graphic processing unit (GPU), a main processing unit (MPU), or the like.

According to an embodiment, the processor 130 may communicate with the server 200 providing the website through the first communication interface 110-1 and the second communication interface 110-2.

Specifically, the processor 130 may access the access point for the Wi-Fi network through the first communication interface 110-1 and establish the first channel for communication with the server 200. The processor 130 may communicate with the server 200 through the established first channel.

The processor 130 may establish the second channel for communication with the server 200 by accessing the base station for the mobile network through the second communication interface 110-2. The processor 130 may communicate with the server 200 through the established second channel.

One or more embodiments confirm the security of the first channel based on the information obtained through the second channel, the security of the second channel being relatively high as compared to the first channel. It is understood, however, that one or more other embodiments are not limited to the case where the first channel is a channel for the Wi-Fi network and the second channel is a channel for the mobile network. That is, if within the limits that can confirm the security of the first channel based on the information obtained through the second channel, the first channel and the second channel according to various embodiments may be channels for various types of networks.

Hereinbelow, for convenience of description, it will be described that the processor 130 performs communication through the first channel via the Wi-Fi network and the second channel via the mobile network.

The processor 130 may receive a user command to access the website. The processor 130, in response to the received user command, may obtain the first information related to the website address from the server 200 providing the website through the first channel, and obtain the second information related to the website from the server 200 through the second channel.

Here, the first information and the second information may be information capable of identifying the website, and are capable of confirming the security of the communication channel for communication with the server providing the corresponding website by comparing both information.

Specifically, the first information and the second information may be information related to the website address. The information related to the website address may include at least one of information about a protocol that is used for communication with the server 200 providing the website and information about a domain name of the website.

According to an embodiment, information on the protocol that is used for communication with the server 200 for providing a website may include information about a response of the server 200 with respect to an HTTP request of the electronic device 100. For example, when accessing a website that has a domain name of www.ABC.com via the first channel, and accessing a website that has a domain name of www.ABC.com via the second channel, the server 200 providing the website may transmit the HTTP (http://www.ABC.com) response or HTTPS (https://www.ABC.com) response respectively through the first channel and the second channel.

According to an embodiment, the processor 130 may further include information related to the website address and fingerprint information about the feature point of the content included in the website from the server 200.

For example, when accessing the website of which the domain name is www.XYZ.com through the first channel and accessing the website of which the domain name is www.XYZ.com through the second channel, the processor 130 may receive, from the server 200 providing the website, the fingerprint information for the feature point of the content included in each website through the first channel and the second channel.

Here, the fingerprint information refers to information about the feature point of the content included in the website, and refers to information about a unique feature maintained despite the falsification/alteration of the content. Specifically, the fingerprint information may include information about the location of the text or image included in the web page. The fingerprint information may also include unique information about the color of text or images included in the web page.

It is understood that the information obtained through the first channel and the second channel is not limited to the above examples, and the disclosure may be applied to any information that is capable of confirming the security of the first channel by comparing the information obtained through the first channel and the information obtained through the second channel.

For example, the information obtained through the first channel and the the information obtained through the second channel may include information on the entire content included in at least one webpage among a plurality of webpages provided by the website as described above.

When the first information is obtained through the first channel and the second information is obtained through the second channel, the processor 130 may determine whether to terminate communication with the server 200 through the first channel by confirming the occurrence of the MITM attack for the first channel based on the obtained first information and the obtained second information.

To be specific, when the obtained first information and the obtained second information are the same, the processor 130 may maintain communication with the server 200 through the first channel. In contrast, when the obtained first information and the obtained second information are different, the processor 130 may terminate communication with the server 200 through the first channel.

That is, if the information obtained through the first channel and the information obtained through the second channel having relatively higher security than the first channel are the same, then the processor 130 may determine that the security of the first channel is verified, and may maintain communication with the server 200 through the first channel. If the information obtained through the first channel and the information obtained through the second channel are different, the processor 130 may determine that the MITM attack for the first channel has occurred, and terminate communication with the server 200 through the first channel.

In the above example, when the server 200 providing the website transmits the HTTP (e.g., http://www.ABC.com) response through the first channel and transmits the HTTPS (e.g., https://www.ABC.com) response through the second channel, the processor 130 may determine that the MITM attack for the first channel has occurred, and may terminate communication with the server 20 through the first channel.

When the server 200 providing the website transmits the HTTP (e.g., http://www.ABC.com) response through the first channel and the HTTP (e.g., http://www.ABC.com) response through the second channel in the same manner, the processor 130 may determine that the security of the first channel is confirmed, and maintain communication with the server 200 through the first channel. This case corresponds to the case where the HTTPS is not supported in the website.

When the server 200 providing the website transmits the HTTPS (e.g., https://www.ABC.com) response through the first channel and transmits the HTTPS (e.g., https://www.ABC.com) response through the second channel as well, the processor 130 may determine that the security of the first channel is confirmed, and maintain communication with the server 200 through the first channel.

When the server 200 providing the website transmits the HTTPS (e.g., https://www.ABC.com) response through the first channel, this case corresponds to the case where the MITM attack has not occurred. Thus, in accordance with an embodiment, the electronic device 100, in response to a user command to access the website, may obtain the first information through the first channel and determine whether the obtained first information includes the HTTPS response of the server 200, and may obtain the second information through the second channel only when the first information does not include the HTTPS response of the server 200.

By way of another example, when receiving third information including fingerprint information of website www.XYZ.com via the first channel and receiving fourth information including fingerprint information of www.XYZ.com via the second channel, the processor 130 may maintain communication with the server 200 through the first channel if the third information and the fourth information are the same, and may terminate communication with the server 200 through the first channel, when the third information and the fourth information are different.

It has been described that, if the obtained first information and the second information are different, communication with the server 200 is terminated. According to still another embodiment, the processor 130 may perform communication with the server 200 through the first channel based on the second information when the obtained first information and second information are different.

To be specific, when the HTTP is included in the first information, and the HTTPS is included in the second information, the processor 130 may communicate with the server 200 through the first channel based on the second information.

For example, when the server 200 providing a website transmits the HTTP (e.g., http://www.ABC.com) response through the first channel and the HTTPS (e.g., https://www.ABC.com) response through the second channel, the processor 130 may transmit the address information obtained through the second channel to the malicious AP of the first channel, thereby securing the security of the first channel.

According to various embodiments as described above, the electronic device 100 may communicate with the server 200 providing a website through the Wi-Fi network, after verifying the security or integrity of the Wi-Fi network by confirming whether the MITM attack has occurred with respect to a specific access point 10, based on the information obtained through the out-of-band channel of the network for reliable security.

Accordingly, the user of the electronic device 100 may use a Wi-Fi network that has relatively rapid data transmission speed and that may not incur a mobile communication fee according to data transmission, after confirming security of the Wi-Fi network.

Hereinafter, with reference to FIGS. 3 to 6, a specific type of the MITM attack with respect to the access point for the Wi-Fi network and various embodiments to respond thereto will be described more specifically.

Figure 3:
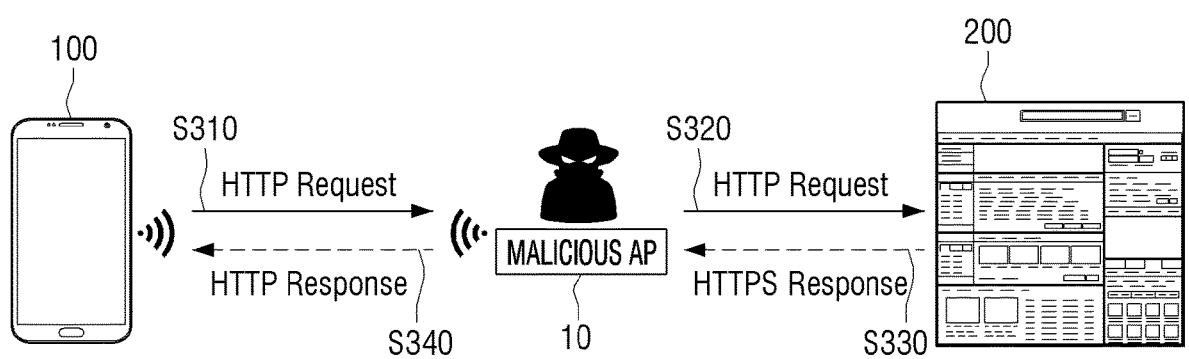
FIG. 3 is a view of a type of a man-in-the-middle (MITM) attack and an embodiment to respond thereto.
Figure 4:
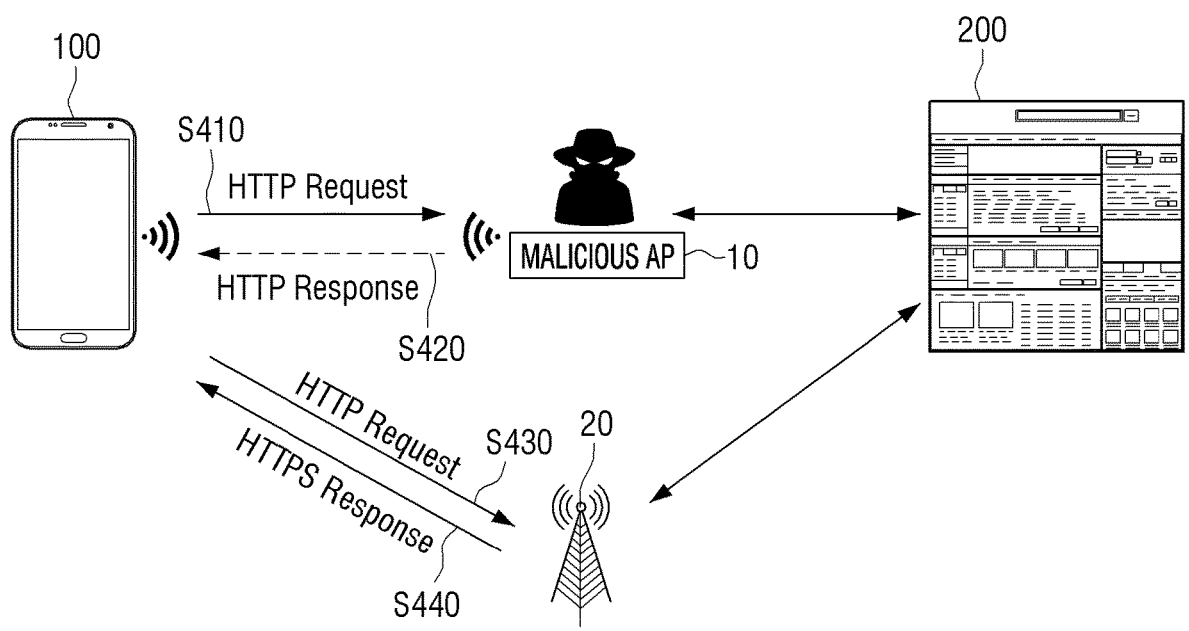
FIG. 4 is a view of a type of a man-in-the-middle (MITM) attack and an embodiment to respond thereto.

FIGS. 3 and 4 are views of a type of a man-in-the-middle (MITM) attack and a response thereto according to an embodiment.

In communication using a TCP/IP network such as the Internet, in order to prevent sensitive information from being exposed in a data transmission process between a client 100 and a server 200, a cryptographic protocol such as Secure Socket Layer (SSL) may be applied to a communication section. In addition, HTTPS, not HTTP, is used as a protocol for applying the SSL, and uniform resource locators (URLs) of web pages using HTTPS start with "https://" instead of "http://."

When the SSL is applied, server load may increase and a verification fee is incurred. In this regard, a website that does not apply the SSL or a website which uses the SSL only for a specific communication section is provided to a user.

When the SSL is not applied or the SSL is applied to only a specific communication section, it is possible to sniff or modulate the communication content through the Wi-Fi network by the malicious AP 10 by the MITM attack.

FIG. 3 illustrates an example of the MITM attack, and is a view to describe a process of the MITM attack by the SSL strip technique.

The electronic device 100 may access a website provided by the server 200 using the HTTP in operation S310. The MITM may receive an HTTP request transmitted by the electronic device 100 through the malicious access point 10, and transmit the received HTTP request to the server 200 in operation S320.

Then, when encrypted communication is required, such as when the login to the website is performed by the user of the electronic device 100, the server 200 may transmit the HTTPS response so that SSL may be applied in operation S330. At this time, the MITM may receive the HTTPS response transmitted by the server 200 through the malicious access point 10, and may modulate the received response into HTTP and transmit the received response to the electronic device 100 in operation S340.

Thereafter, the electronic device 100 that received the modulated response with the HTTP response may transmit, to the server 200, information including account information of a user, or the like, through HTTP while the SSL is not applied. In this case, the MITM may perform sniffing by receiving the information transmitted by the user.

In other words, the SSL strip technique is a technique in which the MITM snatches and modulates the HTTPS response transmitted by the server 200 through the malicious access point 10, so as to perform communication with HTTP, not HTTPS, when a session between the electronic device 10 and the server 200 is connected.

FIG. 4 is a view illustrating an embodiment to respond to the MITM attack by the SSL strip technique as illustrated in FIG. 3.

As described above, the electronic device 100 may access the website provided by the server 200 by transmitting the HTTP request through the Wi-Fi network in operation S410, and the MITM may receive the HTTP response transmitted by the server 200 through the malicious access point 10, modulate the received response to the HTTP response, and transmit the same to the electronic device 100 in operation S420.

As described above, communication with the server 200 is performed by accessing the access point 10 for the Wi-Fi network. Furthermore, the electronic device 100 according to an embodiment may also perform communication with the server 200 by accessing the base station 20 for the mobile network.

According to an embodiment, the electronic device 100 may confirm the security of the Wi-Fi network based on information obtained through the mobile network of which security is relatively high as compared to the Wi-Fi network.

As illustrated in FIG. 4, the electronic device 100 may not only access the website through the Wi-Fi network but also access the website provided by the server 200 by transmitting the HTTP request through the mobile network in operation S430.

The mobile network has low external accessibility due to the closed network structure operated by a mobile carrier, and an authentication process needs to be performed through the Universal Subscriber Identity Module (USIM), or the like. Thus, the mobile network has relatively high security compared to the Wi-Fi network. Therefore, when the electronic device 100 transmits the HTTPS response so that the server 200 may be applied with SSL after the electronic device 100 accesses the website via the mobile network in operation S440, it is difficult for the MITM to receive and modulate the HTTPS response transmitted by the server 200. As a result, the electronic device 100 may receive the HTTPS response transmitted by the server 200 as it is.

According to the above description, the electronic device 100 according to an embodiment may obtain an HTTP response through the Wi-Fin network and an HTTPS response through the mobile network. In this case, the information obtained from the Wi-Fi network is different from the information obtained from the mobile network, and the electronic device 100 may determine that the MITM attack has occurred for the Wi-Fi network. Therefore, in this case, the electronic device 100 may terminate communication with the server 200 through the access point 10 that is currently accessed.

According to another embodiment, when (e.g., based on) it is determined that the MITM attack on the Wi-Fi network has occurred, as described above, the electronic device 100 may communicate with the server 200 via the Wi-Fi network based on the HTTPS response obtained through the mobile network. Specifically, the electronic device 100 may transmit to the malicious access point 10 based on the address information including the HTTPS response obtained through the mobile network, thereby securing the security of the Wi-Fi network.

Figure 5:
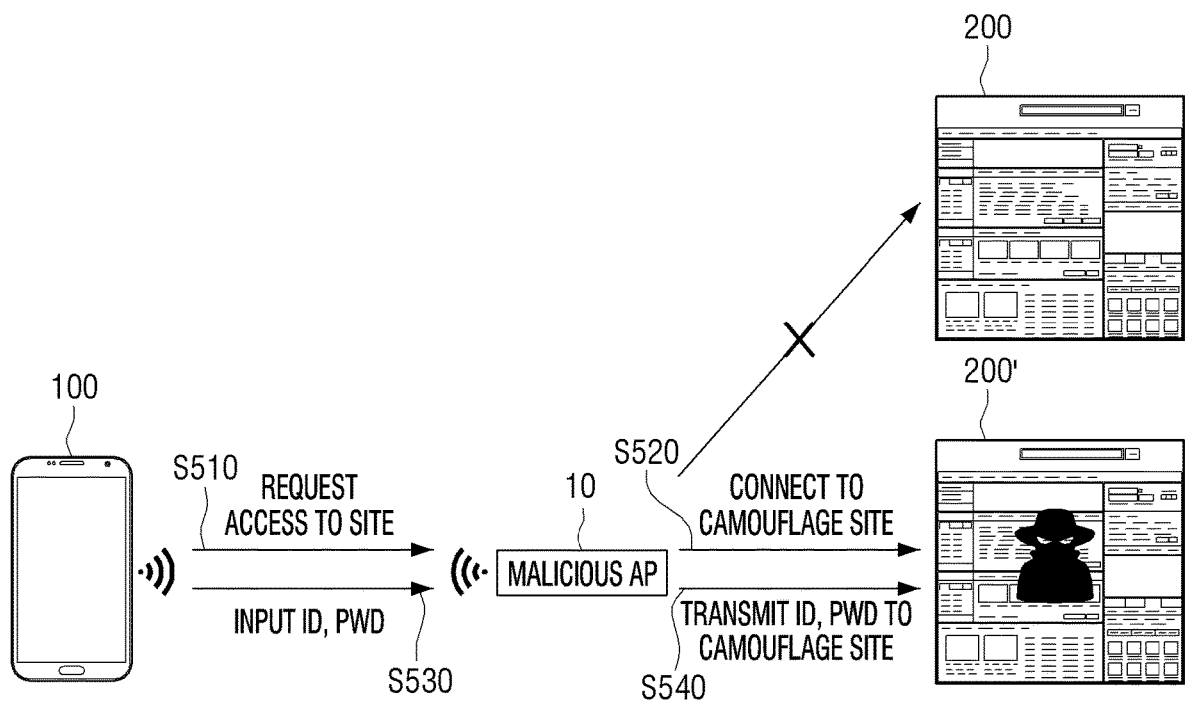
FIG. 5 is a view provided to describe another type of the MITM attack and an embodiment to respond thereto.
Figure 6:
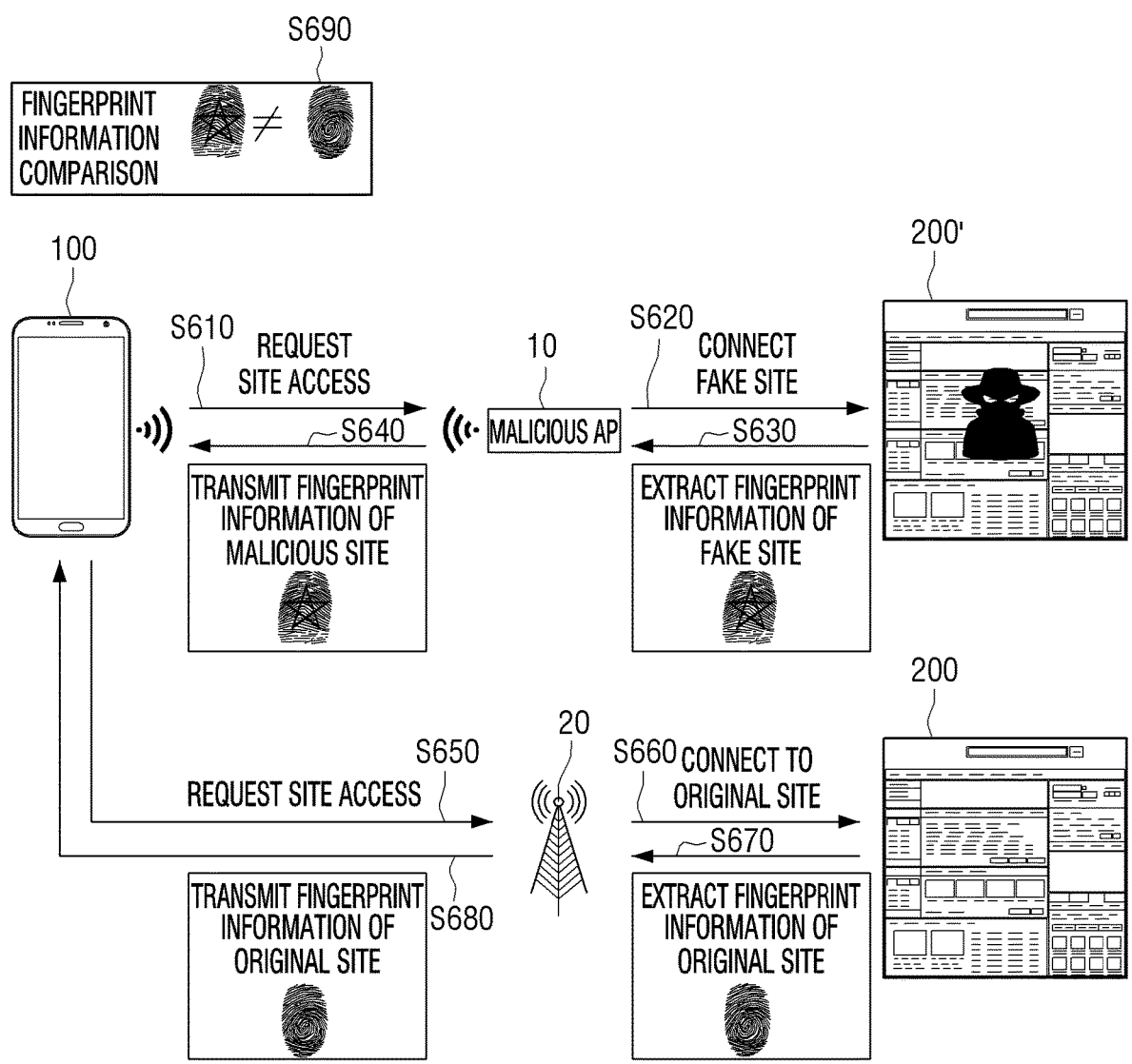
FIG. 6 is a view provided to describe another type of the MITM attack and an embodiment to respond thereto.

FIGS. 5 and 6 are views provided to describe another type of the MITM attack and a response thereto according to an embodiment.

FIG. 5 is a still another example of the MITM attack. This is a view to describe a phishing or pharming process by the MITM attack.

When access to the website provided by the server 200 is requested by the electronic device 100 in operation S510, the MITM may cause the electronic device 100 to access the fake website that is modulated by the MITM, instead of an original website, by an attack technique such as address resolution protocol (ARP) spoofing or domain name system (DNS) spoofing in operation S520.

Here, the ARP spoofing is a technique to modulate the ARP, which is the protocol to connect the Internet Protocol (IP) address and media access control (MAC) address. To be specific, the ARP spoofing refers to an attack technique to connect the specific IP address to attack to the MAC address of the fake website of the MITM, by modulating the ARP.

The DNS spoofing is a technique to modulate the DNS that is a protocol to connect the domain name and the IP address. To be specific, the DNS spoofing refers to the attack technique to connect the name of a specific domain to be attacked to the IP address of the fake website by modulating the DNS.

When the electronic device 100 transmits the user account and a password to the server 200 after the electronic device 100 accesses the fake website of the MITM by various attack techniques including the aforementioned attack techniques, the MITM may obtain the user account and password through the fake website.

FIG. 6 is a view of an embodiment to respond to the phishing or pharming by the MITM attack as illustrated in FIG. 5.

As described above, when the electronic device 100 requests access to a website provided by the server 200 through the Wi-Fi network in operation S610, the MITM may cause the electronic device 100 to access the fake website modulated by the MITM, not the original website, by the attack technique such as ARP spoofing or DNS spoofing in operation S620. Thereafter, the electronic device 100 may obtain fingerprint information on the feature point of the content included in the fake website from the server 200 in operations S630 and S640.

As described above, the communication with the server 200 is performed by accessing the access point 10 for the Wi-Fi network. Furthermore, the electronic device 100 according to an embodiment may also communicate with the server 200 by accessing the base station 20 for the mobile network.

As described above, in the case of the mobile network that has higher security than the Wi-Fi network, it is difficult to for the mobile network to be attacked via a technique such as the ARP spoofing or the DNS spoofing.

When the electronic device 100 requests access to the website provided by the server 200 through the mobile network in operation S650, the original website, not the fake website modulated by the MITM, may be accessed in operation S660. The electronic device 100 may obtain the fingerprint information for the feature point of the content included in the original website from the server 200 in operations S670 and S680.

The fingerprint information refers to information about the characteristic point of the content included in the website, and refers to information about a unique characteristic maintained despite the falsification/alteration of the content. Specifically, the fingerprint information may include information about the location of the text or image included in the web page. The fingerprint information may also include unique information about the color of text or images included in the web page.

As described above, the electronic device 100 according to an embodiment may obtain fingerprint information through the Wi-Fi network and a mobile network, respectively. In this case, since the information obtained through the Wi-Fi network and the information obtained through the mobile network are different, the electronic device 100 may determine that the MITM attack for the Wi-Fi network has occurred, and terminate communication with the server 200 via the currently connected access point 10.

Unlike the example of FIG. 6, when the MITM attack for the Wi-Fi network has not occurred, the fingerprint information obtained through the Wi-Fi network and the fingerprint information through the mobile network are the same and thus, the electronic device may determine that communication with the server 200 is maintained through the currently-accessed access point 10.

While an embodiment for obtaining the fingerprint information through the Wi-Fi network and the mobile network has been described, according to another embodiment, information on the entire content included in at least one webpage among a plurality of webpages provided by the website through the Wi-Fi network and the mobile network may be obtained respectively. In this case, security of the Wi-Fi network may be confirmed based on whether the information on the entire content obtained through the Wi-Fi network and the information on the entire content obtained through the mobile network are the same.

In the description above, a type of the MITM attack and a response thereto according to various embodiments have been described with reference to FIGS. 3 to 6, but one or more other embodiments are not limited thereto. That is, various embodiments may be implemented to respond to various MITM attacks.

Figure 7:
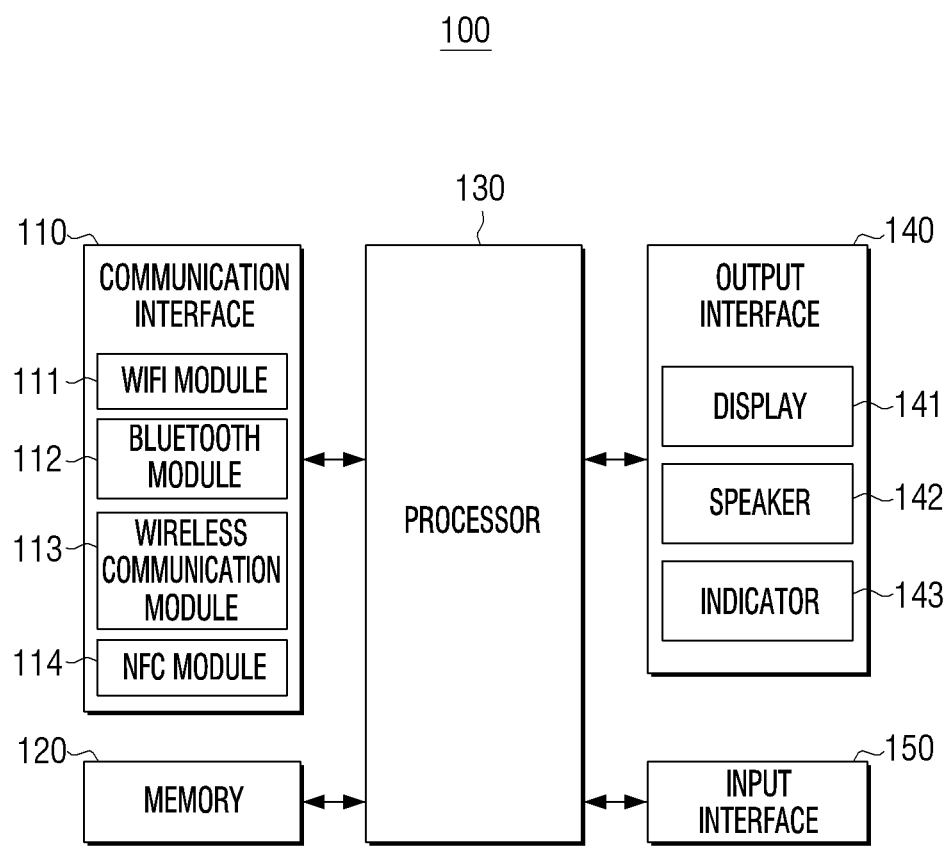
FIG. 7 is a block diagram specifically illustrating a configuration of an electronic device according to an embodiment.
Figure 8:
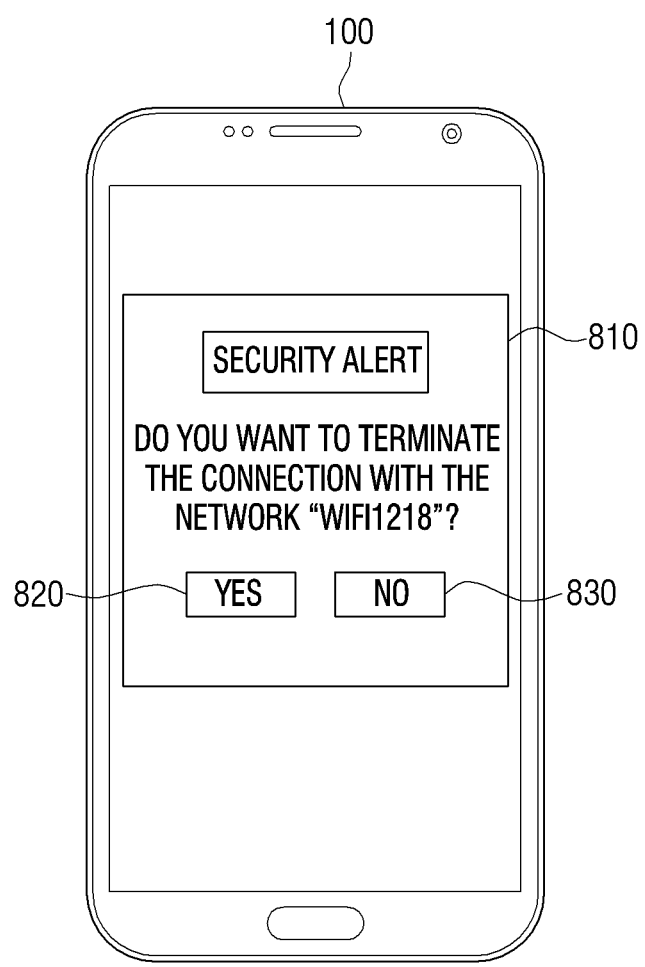
FIG. 8 is a view of a user interface providing a security alert notification according to an embodiment.

FIG. 7 is a block diagram specifically illustrating a configuration of an electronic device according to an embodiment, and FIG. 8 is a view of a user interface providing a security alert notification according to an embodiment.

As illustrated in FIG. 7, the electronic device 100 according to an embodiment may include the communication interface 110, the memory 120 and the processor 130, and may further include an output interface 140 and an input interface 150. This configuration is merely exemplary, and in various embodiments, one or more components may be added or omitted.

The communication interface 110 may include at least one of a Wi-Fi module 111, a Bluetooth module 112, a wireless communication module 113, and a near field communication (NFC) module 114.

To be specific, the Wi-Fi module 111 may communicate by a Wi-Fi method and the Bluetooth module 112 may communicate by a Bluetooth method. When using the Wi-Fi module 111 or the Bluetooth module 112, various connection information such as service set identifier (SSID) may be transmitted and received for communication connection and then various information may be transmitted and received.

The wireless communication module 113 may communicate according to various communication specifications such as IEEE, Zigbee, 3rd generation (3G), 3rd generation partnership project (3GPP), long term evolution (LTE), 5th generation (5G), or the like. The NFC module 114 may communicate by the NFC method using a 13.56 MHz band among various RF-ID frequency bands such as 135 kHz, 13.56 MHz, 433 MHz, 860-960 MHz, 2.45 GHz, or the like.

In various embodiments, the first communication interface 110-1 among the communication interface 110, may be for accessing the access point for the Wi-Fi network, and the second communication interface 110-2, among the communication interface 110, may be for accessing the base station for the mobile network as has been described with respect to FIG. 2.

That is, the first communication interface 110-1 may include the Wi-Fi chip 111, and the second communication interface 110-2 may include a wireless communication chip 113. However, the first communication interface 110-1 and the second communication interface 110-2 according to various embodiments are not limited to the interface for a specific communication method. Meanwhile, the term communication interface 110 hereinafter will be referred to collectively as the first communication interface 110-1 and the second communication interface 110-2.

The output interface 140 may output various functions that the electronic device 100 may perform. The output interface 140 may include at least one of a display 141, a speaker 142, and an indicator 143.

The display 141 may output image data under the control of the processor 130. For example, the display 141 may output an image pre-stored in the memory 120 under the control of the processor 130. In particular, the display 141 according to an embodiment may display a user interface stored in the memory 120.

The display 141 may be implemented as a liquid crystal display panel (LCD), organic light emitting diode (OLED) display, or the like, and the display 141 may be implemented as a flexible display, a transparent display, or the like, according to use cases. The display 141 according to the disclosure is not limited to a specific type.

The speaker 142 may output audio data by the control of the processor 130, and the indicator 143 may be lit by the control of the processor 130.

In an embodiment, when the first information obtained through the first channel and the second information obtained through the second channel are different, the processor 130 may provide a notification inquiring whether or not the communication with the server 200 through the first channel is terminated.

To be specific, when the information obtained through the first channel and the information obtained through the second channel are different, the processor 130 may determine that the MITM attack on the first channel has occurred. In this case, as described above, the processor 130 may terminate communication with the server 200 through the first channel, or may provide a notification inquiring whether the communication is to be terminated before the communication is terminated.

Meanwhile, a notification for inquiring whether the communication with the server 200 is to be terminated through the first channel may be provided as a user interface 810 through the display 141. Specifically, as shown in FIG. 8, the processor 130 may provide the user interface 810 including a message such as "security alert," "Do you want to terminate the connection with the network WiFi1218?" through the display 141.

The processor 130 may output a voice inquiring whether to terminate the communication through the speaker 142, and provide a security alert notification for the first channel by controlling so that the indicator 143 is to be lit.

When the security alert notification is provided as described above, the user of the electronic device 100 may input a user command through the input interface 150 as described below, so that communication with the server 200 is performed through the network according to a user's selection.

The input interface 150 receives a user command for controlling the overall operation of the electronic device 100. To be specific, the input interface 150 may include a camera, a microphone, a remote control signal receiver, or the like. Meanwhile, the input interface 150 may be implemented with a touch screen that is included in the display 141.

According to an embodiment, a user may input a user command through the input interface 150 and select a network to communicate with the server 200. In particular, as described above, when a notification is provided to inquire whether the communication with the server 200 through the first channel is terminated through the output interface 140, the user may recognize that the MITM attack on the first channel has occurred. Accordingly, the user may input a user command through the input interface 150 and select a network to communicate with the server 200 in an active manner.

Specifically, the user who receives the security alert notification through the user interface 810 as described above may input a user command to terminate the connection to the currently connected access point through the input interface 150. According to the example shown in FIG. 8, the user may select "Yes 820" among the selection commands included in the user interface 810 to terminate the connection to the currently connected access point, to thereby input a user command to terminate the connection to the currently connected access point.

In this case, additionally, the user may input a user command to perform communication with the server 200 via the mobile network, or input at least one user command to access an access point other than the access point where the MITM has occurred and perform communication with the server 200 through the Wi-Fi network.

Despite the security alert notification as described above, the user may wish to continue to perform communication with the server 200 via the access point in which the MITM attack has occurred. In this case, the user may input a user command through the input interface 150 to maintain connection to the currently connected access point.

Specifically, as illustrated in FIG. 8, the user may select "No 830" among selection commands included in the user interface 810, in order to maintain connection with the currently accessed access point.

According to an embodiment of the security alert notification as described above, the user of the electronic device 100 may recognize that the MITM attack on the first channel has occurred, and may pay attention to communication with the server through the access point currently connected to the electronic device 100. In this case, the user may input a user command through the input interface 150 to actively select a network to communicate with the server 200.

Figure 9:
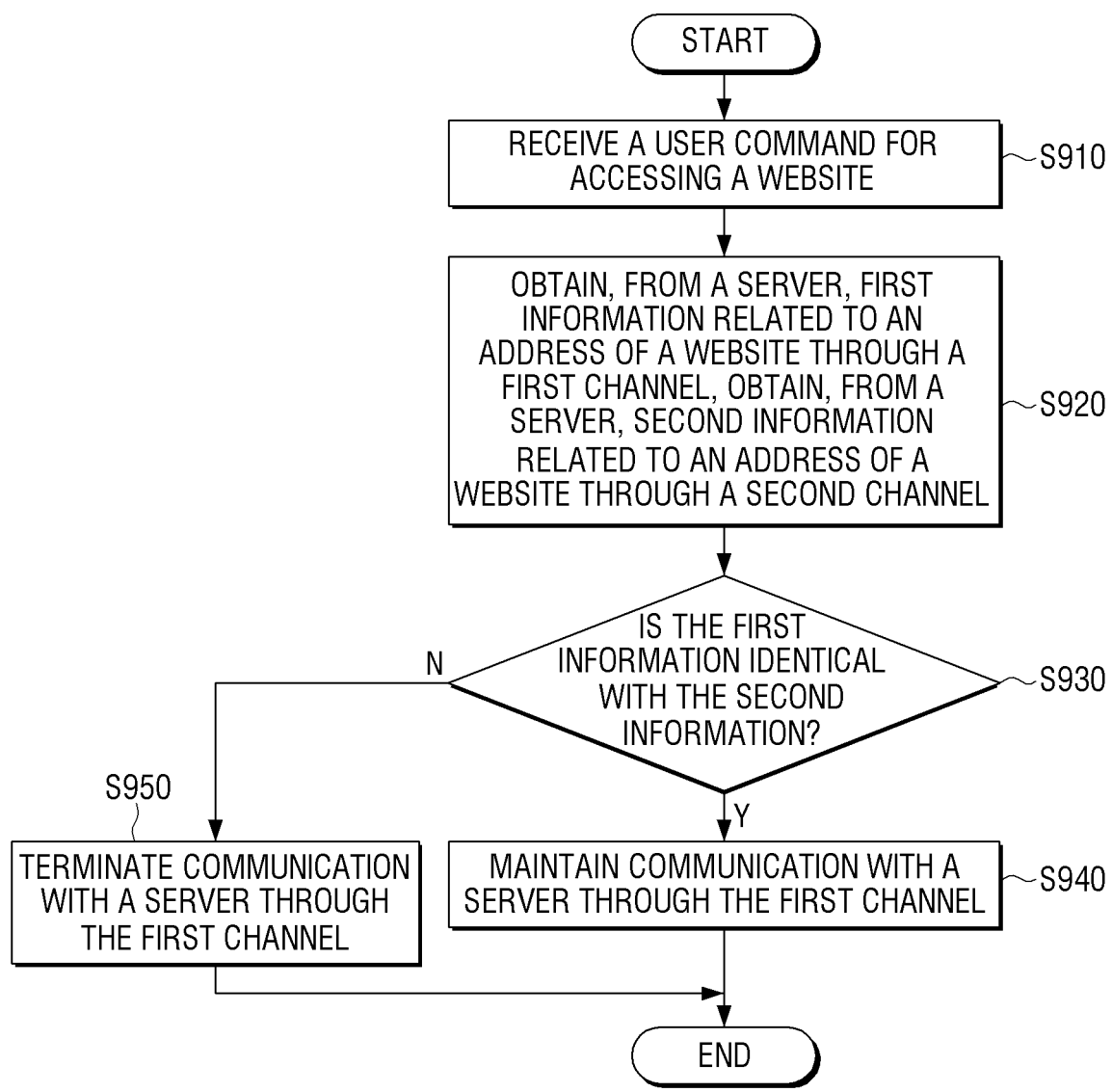
FIG. 9 is a view illustrating a controlling method of an electronic device according to an embodiment.

FIG. 9 is a view illustrating a controlling method of an electronic device 100 according to an embodiment.

As described above, the electronic device 100 according to an embodiment may access the access point for the Wi-Fi network, and establish the first channel for communication with the server 200. The electronic device 100 may perform communication with the server 200 through the established first channel.

The electronic device 100 may access the base station for the mobile network and establish the second channel for communication with the server 200. The electronic device 100 may communicate with the server 20 through the established second channel.

Meanwhile, as illustrated in FIG. 9, the electronic device 100 according to an embodiment may receive a user command for accessing a website in operation S910. In response to the received user command, the electronic device 100 may obtain first information related to the address of the website from the server 200 providing the website through the first channel, and obtain the second information related to the website address from the server 200 through the second channel in operation S920.

According to an embodiment, the electronic device 100 may access a website having a domain name of www.ABC.com through the first channel, access a website having a domain name of www.ABC.com similarly through the second channel, and obtain information including an HTTP (http://www.ABC.com) response providing the website through the first channel or an HTTPS (https://www.ABC.com) response from the server 200 providing the website through the second channel.

When the first information is obtained through the first channel and the second information is obtained through the second channel, the electronic device 100 may determine whether the obtained first information and the second information are the same in operation S930. In addition, the electronic device 100 may determine whether to maintain communication with the server 200 through the first channel by confirming whether the MITM attack has occurred on the first channel based on whether the obtained first information and the second information are the same or not.

Specifically, if the obtained first information and the second information are the same in operation S930-Y, the electronic device 100 may maintain communication with the server 200 through the first channel in operation S940. If the obtained first information and the second information are different in operation S930-N, the electronic device 100 may terminate communication with the server 200 through the first channel in operation S950.

In the example as described above, when (e.g., based on) the server 200 providing the website transmits the HTTPS (https://www.ABC.com) response through the first channel and transmits the HTTPS (https://www.ABC.com) response through the second channel as well, the electronic device 100 may determine that the security of the first channel is confirmed and maintain communication with the server 200 through the first channel.

In the meantime, if (e.g., based on) the server 200 providing the website transmits the HTTP (http://www.abc.com) response through the first channel, and transmits the HTTPS (https://www.ABC.com) through the second channel, the electronic device 100 may determine that the MITS attack has occurred on the first channel and terminate communication with the server 200 through the first channel.

The controlling method of the electronic device 100 according to the aforementioned embodiment may be implemented as a program and provided to the electronic device 100. In particular, a program including the controlling method of the electronic device 100 may be stored in a non-transitory computer readable medium and provided.

Specifically, in a computer-readable recording medium including a program for executing a controlling method of the electronic device 100, the controlling method includes receiving a user command to access a website, in response to the received user command, obtaining, from the server 200, first information associated with an address of the website through the first channel and obtaining, from the server 200, second information associated with the address of the website through the second channel, if the first and second information are the same, maintaining communication with the server 200, and if the first information is different from the second information, terminating communication with the server 200 through the first channel.

The non-transitory computer readable medium refers to a medium that stores data semi-permanently rather than storing data for a very short time, such as a register, a cache, a memory, etc., and is readable by an apparatus (i.e., executable by at least one processor). In detail, the aforementioned various applications or programs may be stored in the non-transitory computer readable medium, for example, a compact disc (CD), a digital versatile disc (DVD), a hard disc, a Blu-ray disc, a universal serial bus (USB), a memory card, a read only memory (ROM), and the like, and may be provided.

FIG. 10 is a sequence view illustrating a security confirmation process of Wi-Fi network in a time-series manner according to an embodiment.

As illustrated in FIG. 10, the electronic device 100 according to an embodiment may access the access point 10 and perform communication with the server 200 through the Wi-Fi network, and the electronic device 100 may communicate with the server 200 through the mobile network by accessing the base station 20.

In the meantime, the electronic device 100 according to an embodiment may receive a user command for accessing a website in operation S1010. In addition, the electronic device 100 may request first information from the server 200 through the access point 10 in response to the received user command in operation S1015, and also request the second information from the server 200 through the base station 20 in operation S1020.

When (e.g., based on) the first information is requested, the server 200 may identify the first information in operation S1025 and transmit the first information to the electronic device 100 through the access point 10 in operation S1030. The device 100 may receive the first information in operation S1035. When (e.g., based on) the second information is requested, the server 200 may identify the second information in operation S1040 and transmit the second information to the electronic device 100 through the base station 20 in operation S1045. The electronic device 100 may receive the second information in operation S1050.

When (e.g., based on) the first information and the second information are obtained, the electronic device 100 may determine whether the obtained first information and the obtained second information are the same in operation S1055. In addition, the electronic device 100 may determine whether to terminate communication with the server 200 through the Wi-Fi network, by confirming the security of the Wi-Fi network through the access point 10 currently accessed, based on whether the obtained first information is the same as the obtained second information in operation S1060.

In particular, if the obtained first information and the second information are the same, the electronic device 100 may maintain communication with the server 200 through the currently connected access point 10. However, if the obtained first information and second information are different, the electronic device 100 may terminate communication with the server 200 through the currently connected access point 10.

While the communication process between the electronic device 100 and the server 200 has been described above as sequential, it is understood that one or more other embodiments are not limited thereto. In this regard, there is no particular time series element in the process from the request of the first information and the request of the second information in operations S1015 and S1020 to the reception of the first information and the reception of the second information in operations S1035 and S1050.

According to various embodiments, the electronic device 100 may confirm whether the MITM attack for the specific access point 100 has occurred based on the information that is obtained through the out-of-band channel of the network of which security is reliable, and verify integrity or security of the Wi-Fi network, and communicate with the server 200 providing a website through the Wi-Fi network.

Accordingly, the user of the electronic device 100 may use a network of which security is reliable within the limit for confirming security of the Wi-Fi network.

In addition, in accordance with an embodiment, when (e.g., based on) it is determined that the MITM attack to the Wi-Fi network has occurred, the electronic device 100 may enable a user of the electronic device to actively select a network to perform communication with the server 200 by providing a notification asking whether to terminate the communication.

In addition, each of the components (e.g., modules or programs) according to various embodiments may include a single entity or a plurality of entities, and some sub-components of the sub-components described above may be omitted, or other sub-components may be further included in the various embodiments. Alternatively or additionally, some components (e.g., modules or programs) may be integrated into one entity to perform the same or similar functions performed by the respective components prior to the integration.

The operations performed by the module, the program, or other component, in accordance with various embodiments may be performed in a sequential, parallel, iterative, or heuristic manner, or at least some operations may be executed in a different order or omitted, or other operations may be added.

The term "unit" or "module" used in the disclosure includes units consisting of hardware, software, or firmware, and is used interchangeably with terms such as, for example, logic, logic blocks, parts, or circuits. A "unit" or "module" may be an integrally constructed component or a minimum unit or part thereof that performs one or more functions. For example, the module may be configured as an application-specific integrated circuit (ASIC).

Embodiments may be implemented as software that includes instructions stored in machine-readable storage media readable by a machine (e.g., a computer). A device may call instructions from a storage medium and that is operable in accordance with the called instructions, including an electronic device (e.g., the electronic device 100). When the instruction is executed by a processor, the processor may perform the function corresponding to the instruction, either directly or under the control of the processor, using other components. The instructions may include a code generated or executed by the compiler or interpreter.

The machine-readable storage medium may be provided in the form of a non-transitory storage medium. Here, "non-transitory" means that the storage medium does not include a signal and is tangible, but does not distinguish whether data is permanently or temporarily stored in a storage medium.

According to one or more embodiments, a method disclosed herein may be provided in a computer program product. A computer program product may be traded between a seller and a purchaser as a commodity.

A computer program product may be distributed in the form of a machine-readable storage medium (e.g., CD-ROM) or distributed online through an application store (e.g., PLAYSTORE™). In the case of online distribution, at least a portion of the computer program product may be stored temporarily or at least temporarily in a storage medium such as a manufacturer's server, a server in an application store, or a memory in a relay server.

Each of the components (for example, a module or a program) according to one or more embodiments may be composed of one or a plurality of objects, and some sub-components of the subcomponents described above may be omitted, or other subcomponents may be further included in the embodiments. Alternatively or additionally, some components (e.g., modules or programs) may be integrated into one entity to perform the same or similar functions performed by each respective component prior to integration.

Operations performed by a module, program, or other component, in accordance with embodiments, may be performed sequentially, in a parallel, repetitive, or heuristic manner, or at least some operations may be performed in a different order, omitted, or other operations can be added.

While the disclosure has been shown and described with reference to various embodiments thereof, it will be understood by those skilled in the art that various changes in form and details may be made therein without departing from the spirit and scope of the disclosure as defined at least by the appended claims and their equivalents.

What is claimed is:

1. An electronic device comprising:
a first communication interface;
a second communication interface;
a memory storing at least one instruction; and
a processor configured to execute the at least one instruction to:
  receive a user command to access a website,
  based on the received user command, obtain, from a server providing the website through a first channel that is established through the first communication interface, first information related to an address of the website, and obtain, from the server providing the website through a second channel that is established through the second communication interface, second information related to the address of the website,
  based on the first information and the second information being identical, maintain communication with the server through the first channel, and
  based on the first information and the second information being different, terminate the communication with the server through the first channel or communicate with the server through the first channel according to the second information.

2. The electronic device of claim 1, wherein the first information and the second information each comprise information on a protocol that is used for communication with the server.

3. The electronic device of claim 2, wherein the processor is further configured to execute the at least one instruction to, based on HyperText Transfer Protocol (HTTP) being included in the first information and HyperText Transfer Protocol Secure (HTTPS) being included in the second information, communicate with the server through the first channel according to the second information.

4. The electronic device of claim 1, wherein:
the first communication interface is a communication interface to access an access point for a Wi-Fi network; and
the second communication interface is a communication interface to access a base station for a mobile network.

5. The electronic device of claim 1, wherein the processor is further configured to execute the at least one instruction to:
in response to the received user command, further obtain, through the first channel, third information including fingerprint information on a feature point of a content that is included in the website, and further obtain, from the server through the second channel, fourth information including the fingerprint information, based on the third information and the fourth information being identical, maintain the communication with the server through the first channel, and based on the third information and the fourth information being different, terminate the communication with the server through the first channel.

6. The electronic device of claim 1, wherein the first information and the second information each comprise information on a domain name of the website.

7. The electronic device of claim 1, further comprising:
an output interface,
wherein the processor is further configured to execute the at least one instruction to, based on the first information and the second information being different, provide, via the output interface, a notification asking whether to terminate the communication with the server through the first channel.

8. A controlling method of an electronic device, the method comprising:
receiving, by the electronic device, a user command to access a website;
based on the received user command, obtaining, by the electronic device from a server providing the website through a first channel that is established through a first communication interface of the electronic device, first information related to an address of the website, and obtaining, by the electronic device from the server through a second channel that is established through a second communication interface of the electronic device, second information related to the address of the website;
based on the first information and the second information being identical, maintaining, by the electronic device, communication with the server through the first channel; and
based on the first information and the second information being different, terminating, by the electronic device, the communication with the server through the first channel or communicating with the server through the first channel according to the second information.

9. The method of claim 8, wherein the first information and the second information each comprise information on a protocol that is used for communication with the server.

10. The method of claim 9, wherein the terminating the communication with the server through the first channel or the communicating with the server through the first channel according to the second information comprises:
based on HyperText Transfer Protocol (HTTP) being included in the first information and HyperText Transfer Protocol Secure (HTTPS) being included in the second information, communicating with the server through the first channel according to the second information.

11. The method of claim 8, wherein:
the first channel is a channel that is established through an access point for a Wi-Fi network; and
the second channel is a channel that is established through a base station for a mobile network.

12. The method of claim 8, wherein:
the obtaining comprises, in response to the received user command, further obtaining, through the first channel, third information including fingerprint information on a feature point of a content that is included in the website, and further obtaining, from the server through the second channel, fourth information including the fingerprint information;
the maintaining the communication comprises, based on the third information and the fourth information being identical, maintaining the communication with the server through the first channel; and
the terminating the communication comprises, based on the third information and the fourth information being different, terminating the communication with the server through the first channel.

13. The method of claim 8, wherein the first information and the second information each comprise information on a domain name of the website.

14. The method of claim 8, further comprising:
based on the first information and the second information being different, providing a notification asking whether to terminate the communication with the server through the first channel.

15. A non-transitory computer readable recording medium including a program that when executed by an electronic device causes the electronic device to perform a controlling method, the controlling method of the electronic device comprising:
receiving a user command to access a website;
based on the received user command, obtaining, from a server providing the website through a first channel that is established through a first communication interface of the electronic device, first information related to an address of the website, and obtaining, from the server through a second channel that is established through a second communication interface of the electronic device, second information related to the address of the website;
based on the first information and the second information being identical, maintaining communication with the server through the first channel; and
based on the first information and the second information being different, terminating the communication with the server through the first channel or communicating with the server through the first channel according to the second information.

* * * * *